R. J. McKEOWN & W. A. KIRKPATRICK.
AUTOMATIC WEIGHING SCALE.
APPLICATION FILED JUNE 28, 1909.
980,114.
Patented Dec. 27, 1910.
2 SHEETS—SHEET 1.
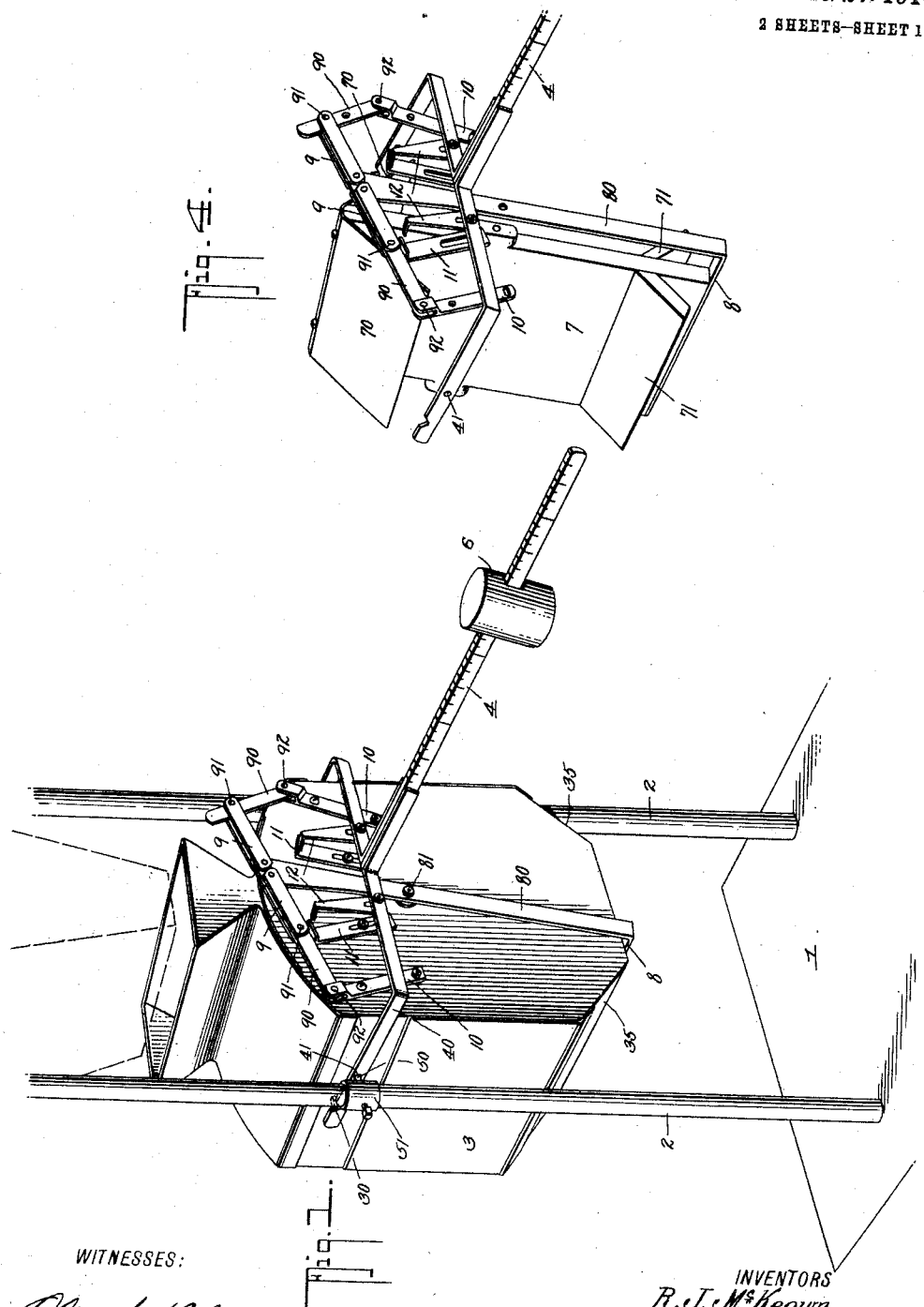
WITNESSES:
Oliver W. Holmes
Charles H. Wagner
INVENTORS
R. J. McKeown and
W. A. Kirkpatrick
BY
Fred G. Dieterich & Co
ATTORNEYS
THE NORRIS PETERS CO., WASHINGTON, D. C.

R. J. McKEOWN & W. A. KIRKPATRICK.
AUTOMATIC WEIGHING SCALE.
APPLICATION FILED JUNE 28, 1909.
980,114.
Patented Dec. 27, 1910.
2 SHEETS—SHEET 2.
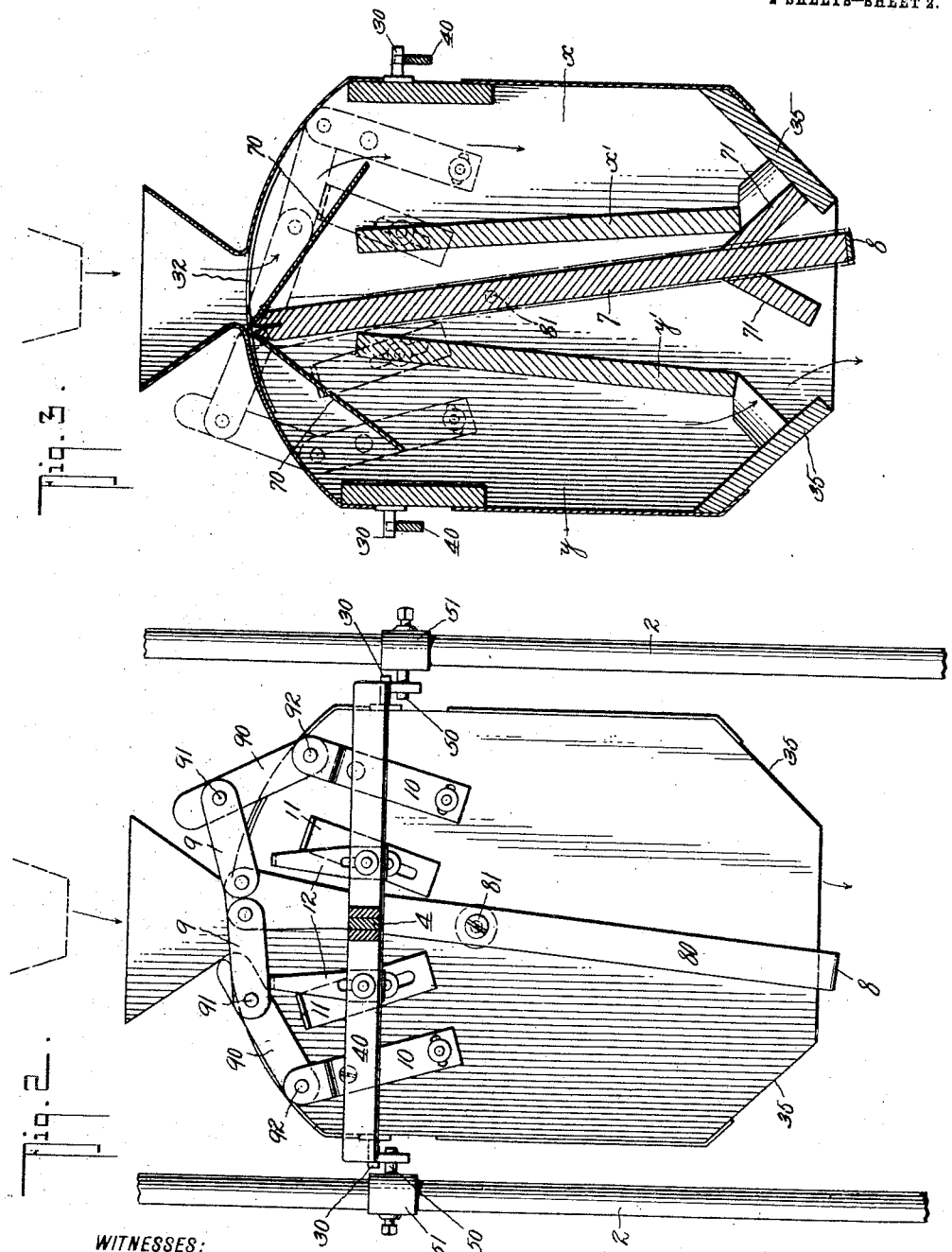
WITNESSES:
INVENTORS
R. J. McKeown and
W. A. Kirkpatrick
BY
Fred G. Dieterich & Co.
ATTORNEYS

UNITED STATES PATENT OFFICE.

RUSSELL J. McKEOWN AND WILLIAM A. KIRKPATRICK, OF ABBYVILLE, KANSAS.

AUTOMATIC WEIGHING-SCALE.

980,114. Specification of Letters Patent. Patented Dec. 27, 1910.

Application filed June 28, 1909. Serial No. 504,753.

*To all whom it may concern:*

Be it known that we, RUSSELL J. McKEOWN and WILLIAM A. KIRKPATRICK, residing at Abbyville, in the county of Reno and State of Kansas, have invented a new and Improved Automatic Weighing-Scale, of which the following is a specification.

The object of our invention is to provide a simple, accurate and automatically operating weighing machine of that type designed for receiving a continuous flow of the material and periodically and automatically discharging predetermined quantities thereof, and our said invention, in its generic nature, comprehends an improved arrangement of a counterbalanced weighing hopper having an internal pivotal diaphragm or deflector that divides the hopper into two bins, devices controlled by the drop of the hopper for shifting the diaphragm from one side to the other, whereby to deflect the continuous inflow of the product being weighed alternately into the separate bins or weighing compartments of the hopper.

Our invention, in its more complete nature, embodies an improved coöperative arrangement of the hopper deflector, the scale beam and shiftable locking devices for holding the deflector locked to its shifted position during the operation of filling and weighing, and adjustable tripper devices for releasing the lock devices that are actuated by the drop action of the hopper, other and subordinate features and combination of parts being also included in our invention, all of which will be hereinafter fully explained, specifically pointed out in the appended claims and illustrated in the accompanying drawings, in which:—

Figure 1, is a perspective view showing our automatic weighing scale as in position for receiving and weighing the product. Fig. 2, is a similar view that shows the weighted lever and hopper as tipped and the deflector locking devices as tripped at that side in which last weighing was made and locked at the other side. Fig. 3, is a vertical section of the hopper, the deflector being shifted and held to one of its positions. Fig. 4, is a detail view in perspective, of the deflector, the weight and hopper supporting lever and the toggle link connections that coöperate with the said lever and the deflector, the construction of which forms the essential feature of our invention.

In the practical application of our invention, the framing on which it is supported is built in different forms according to where the scale is wanted, and in the drawings we have shown but so much framing as will demonstrate the manner in which our machine operates, and its efficiency for weighing and separating material into definite quantities which may be large or small according to the work for which the machine may be especially constructed.

In the drawings, a suitable base 1 is shown, from which rise standards 2—2 upon which our improvements are supported.

3 designates the weighing hopper or receptacle which has knife trunnions 30—30 for seating on the knife bearings in the forked ends 40—40 of the weighing lever 4, the said ends 40 having apertures 41—41 to receive the fulcrum trunnions 50—50 that extend from brackets 51—51 on the standards 2—2, as clearly shown in Fig. 1 by reference to which it will be noted the long end of lever 4 forms the usual type of scale beam to receive the counterpoise 6 which in practice is so placed that it counterbalances the weight of the hopper and the load to be weighed and discharged. Within the hopper is pivotally mounted a deflector 7 which acts as a diaphragm or switch board, the upper end of which extends to the mouth 32 of the hopper and carries wings 70, the lower end of the said deflector also carrying wings 71—71, the purpose of which will presently appear. The several upper and lower wings on the member 7 are so formed relatively to the member 7 and the inlet and discharge openings of the hopper 3 and are so positioned that when the deflector 7 is swung over, say to the left, as in Fig. 2, the upper end of member 7 will be positioned to one side of the mouth of the hopper and the wing now under said mouth deflects the grain to the compartment or bin $x$, the wing 70 at the receiving side of the hopper now acting as a closure for the said side while the wing 71 in the opposite lower end of member 7 serves to deflect the weight quantity that now discharges from the other or filled side of the hopper laterally into the receptacle provided to receive the weight quantity, it being understood that the same operation occurs when the member 7 is shifted in the other direction except the weighted quantity is discharged laterally in the opposite direction from the hopper into the receptacle provided therefor. To facilitate the alternate feeding in and cutting off of the product into and from the hopper, the upper part of the hopper 3 at the opposite ends is curved toward the mouth and the lower part at the opposite ends is inclined toward the discharge as indicated by 35—35. So that the deflecting action of the member is not interfered with by the "fillings" as they are made in the hopper, each of the compartments *x* and *y* has a fixed inner wall *x'* and *y'* which are arranged as clearly shown in Fig. 4 it being understood the wings 71—71 on the deflector 7 form closure members for the bins or compartments *x* and *y* during the process of filling and weighing.

For holding the deflector 7 positively locked to its alternately shifted positions we have provided the means best shown in Fig. 1 and which consist of a strap arm comprising a lower member 8 that extends under and is made fast to the bottom edge of the deflector 7 and a vertical extension 80 that extends up closely against one side of the hopper, is fulcrumed at 81 on the same stud that fulcrums the member 7 and has its upper end extended to the upper end of hopper 3 and pivotally connected to the members 9—9 of a double set of toggle levers, each consisting of the members 9—90 linked to each other as at 91—91 and having the outer members 90—90 pivotally connected as at 92—92 to brackets 10—10 on opposite ends of the side of the hopper next the scale lever or beam. Coöperating with the toggle levers are a pair of stops 11—11 adjustably mounted on the hopper that are relatively so positioned with respect to the toggle lever devices that when the member 7 is swung in one direction one set of toggle links 9—90 will extend in longitudinal alinement with the pivot 91 and in a plane slightly below the dead center so that so long as the said set of toggles remain extended the arm 80 with the deflector 7 will be positively locked to its shifted position, it being understood the same conditions exist with respect to the other set of toggle devices when the deflector is shifted in the other direction. For positively releasing the toggle levers from their locked position to permit of the automatic reversing of the deflector just as the desired weight of material is led into one bin of the hopper, we have provided tripper fingers 12—12 that are adjustably mounted on the cross bar of the scale beam or lever and these so positioned relatively to the toggle devices that when the hopper drops, by reason of overbalancing the scale beam, the hopper, as it drops, brings the locked toggle members 9—90 into engagement with the tripper finger 12 at the corresponding side which trips the levers 9—90 at that side and allows the weighted material last gathered to quickly discharge; it being also understood that the action of the parts as stated for releasing one set of toggles to throw member 7 sets the other set of toggles to temporarily lock the deflector to its last shifted position.

By adjustably mounting the tripper fingers 12—12 on the scale beam and the stops 10—10 on the hopper, an accurate adjustment of the several parts can be readily provided for.

By providing the deflector 7 with the wings 71 and actuating the toggle devices in the manner stated, there is no leak of material since the wings 71 close the bins before the grain collects therein, and since the lower ends of the bins are the only points shut off and the receiving mouth at all times is open, the grain or other material to be weighed can constantly run it at the top of the hopper.

It will be readily understood the scale beam can be adjusted to any amount, large or small, and to the capacity of the hopper and it is readily adapted for use on threshing machines, elevators, mills and for weighing any material that will readily flow into and through the bins.

Having thus described our invention, what we claim is:

1. The combination of a counterbalanced receptacle having two distinct compartments, and having an inlet and an outlet, each of said compartments having an inlet communicating with the inlet of the receptacle and having an outlet communicating with the outlet of the receptacle, a pivoted diaphragm, and means carried by said diaphragm to shift the stream of material entering the inlet of the receptacle from one compartment to the other and simultaneously open the outlet of one compartment and close the outlet of the other compartment, and means actuated by the descent of the receptacle for shifting the diaphragm.

2. The combination of a counterbalanced weighing receptacle having two compartments each compartment having a fixed inner wall and an inlet and an outlet, said receptacle having a common inlet adjacent to the inlets for the compartments and having a common outlet into which the material from the compartments is discharged through their respective outlets, a pivoted diaphragm in said receptacle, means for holding the diaphragm locked to its extreme positions, said diaphragm being constructed to close off the inlet to one compartment as it closes the outlet to the other compartment, and other means actuated by the drop of the weighing receptacle for releasing the diaphragm locking means.

3. The combination of a counterbalanced weighing receptacle having a single inlet and outlet and two distinct compartments, each in communication with the inlet and outlet, a diaphragm pivotally mounted in the receptacle between the two compartments adapted, under one extreme position, to cut off the flow of material into one of the compartments and cut off the flow of material from the other compartment, toggle link devices for holding the said diaphragm locked to its extreme positions and means actuated by the drop of the receptacle for releasing the toggle link devices.

4. The combination of a receptacle having a single inlet and outlet, and two compartments each having a fixed inner wall, each of said compartments having an inlet and outlet in communication with the inlet and outlet of the receptacle, a diaphragm movably mounted in the receptacle to close the inlet of one compartment and open the outlet for the other compartment and to be shifted to alternate positions by the descent of the receptacle.

5. In an automatic weighing machine, a counterbalanced receptacle having a plurality of compartments each having an inlet and an outlet, and means located between the compartments and actuated by the descent of the receptacle for closing the inlet to one compartment and the outlet to the other compartment.

6. An automatic weighing machine, that comprises a counterbalanced hopper having a plurality of compartments each having a fixed inner wall, an inlet at the upper end and an outlet at the lower end, and means located in the space between the inner walls of the compartments and controlled in its movement by the descent of the hopper for simultaneously closing off the inlet to one of the compartments and the outlet to another of said compartments.

7. In a weighing machine, a counterbalanced receptacle having a pair of compartments each having an inlet and an outlet, an inlet and an outlet for the receptacle common to both compartments, a pivoted diaphragm in the receptacle, said diaphragm having its upper and lower ends formed with closure devices for cutting off the inlet to one compartment and the outlet from the other compartment and means, brought into action by the descent of the receptacle, for shifting the diaphragm.

8. The combination of a receptacle, a scale beam on which it is supported, a movable diaphragm within the receptacle, toggle links for holding the diaphragm at its extreme positions and means brought into action by the descent of the receptacle for buckling the toggle joint, said means including adjustable trippers on the scale beam.

9. The combination with a scale beam, and a weighing receptacle supported thereon, mechanism for causing the receptacle to discharge as the beam is tilted, said mechanism including toggle links, adjustable stops on the receptacle for limiting the movement of the links in one direction and adjustable trippers on the scale beam for moving the links in the other direction.

10. In an automatic weighing machine, the combination of a receptacle, a pivoted diaphragm therein, adapted to deflect the infeeds and the discharges alternately from opposite sides of the receptacle, an oscillating arm fulcrumed on the outside of the receptacle on the diaphragm fulcrum, two sets of toggles connected to the upper end of the said arm, the lower end of which connects with the diaphragm, the scale beam on which the receptacle is mounted and trip devices on the scale beam for alternately engaging the toggle sets to buckle them, for the purposes set forth.

RUSSELL J. McKEOWN.
WILLIAM A. KIRKPATRICK.

Witnesses as to signature of Russell J. McKeown:
    CARL B. FUNSTAIN,
    JOHN McKEOWN.

Witnesses as to signature of William A. Kirkpatrick:
    FLORENCE LEES,
    C. E. D. WOOD.